United States Patent [19]

Kumar et al.

[11] Patent Number: 5,632,373

[45] Date of Patent: May 27, 1997

[54] PROTECTIVE CASE FOR PORTABLE COMPUTER

[75] Inventors: Rajendra Kumar, Akron; Steven E. Brooks, Canton, both of Ohio

[73] Assignee: Khyber Technologies Corporation, Fairlawn, Ohio

[21] Appl. No.: 415,327

[22] Filed: Apr. 3, 1995

[51] Int. Cl.⁶ ............................................. B65D 43/24
[52] U.S. Cl. ..................... 206/305; 206/320; 220/335
[58] Field of Search .................................. 206/305, 320, 206/576; 190/37, 106, 118; 220/335, 338, 318

[56] References Cited

U.S. PATENT DOCUMENTS

| | | | |
|---|---|---|---|
| 2,094,446 | 9/1937 | Clement | 220/338 |
| 2,608,280 | 8/1952 | Stone | 190/37 |
| 3,979,007 | 9/1976 | Thornbloom, Jr. | 220/335 |
| 4,308,939 | 1/1982 | Eubanks et al. | 190/106 |
| 4,522,288 | 6/1985 | Wickman et al. | 190/106 |
| 4,837,590 | 6/1989 | Sprague | 206/320 |
| 4,984,706 | 1/1991 | Cadwell et al. | 220/335 |
| 5,100,098 | 3/1992 | Hawkins | 248/917 |
| 5,214,574 | 5/1993 | Chang | 361/393 |
| 5,325,970 | 7/1994 | Dillon et al. | 206/320 |
| 5,428,922 | 7/1995 | Butcher | 206/320 |

FOREIGN PATENT DOCUMENTS 153181 11/1920 United Kingdom .................... 190/118

*Primary Examiner*—Jimmy G. Foster
*Attorney, Agent, or Firm*—Sand & Sebolt

[57] ABSTRACT

A protective case for housing a portable computer having a keyboard and a display, which protective case includes a keyboard case for receiving the keyboard and a display case for receiving the display. The display case is pivotally attached to the keyboard case and is movable between an open position and a closed position relative to the keyboard case. The axis of rotation of the display case relative to the keyboard case is coaxial with the axis of rotation of the display relative to the keyboard of the portable computer. An articulating handle is provided which attaches to both the keyboard case and the display case, and articulates about a pivot pin as the display case moves relative to the keyboard case. Additionally, the handle may be moved between an unlatched position whereby the display case pivots freely relative to the keyboard case, and a latched position whereby the display case is retained against movement relative to the keyboard case. In the unlatched position, the handle articulates about a pivot pin which is parallel to the axis of rotation of the portable computer. In the latched position, the pivot pin is substantially perpendicular to the axis of rotation of the portable computer thereby preventing movement of the display relative to the keyboard.

20 Claims, 6 Drawing Sheets

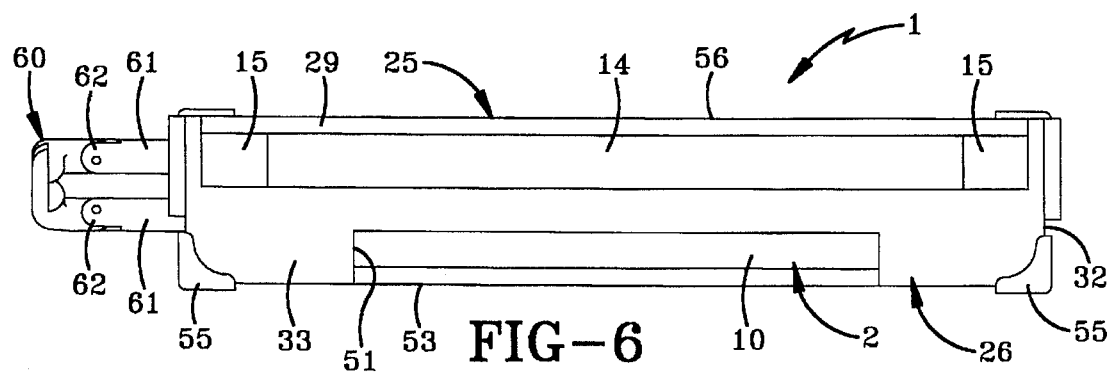
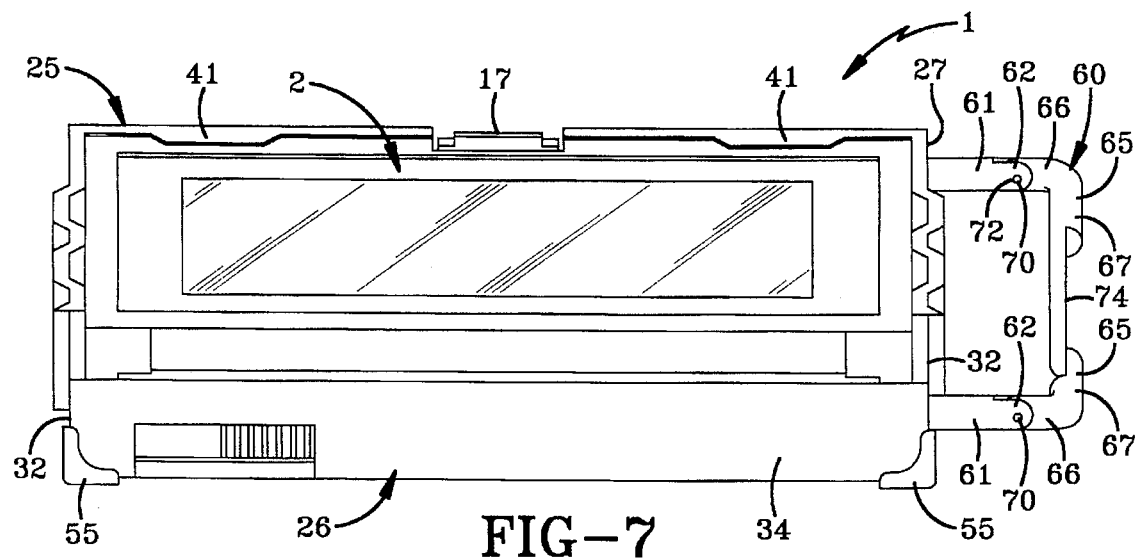
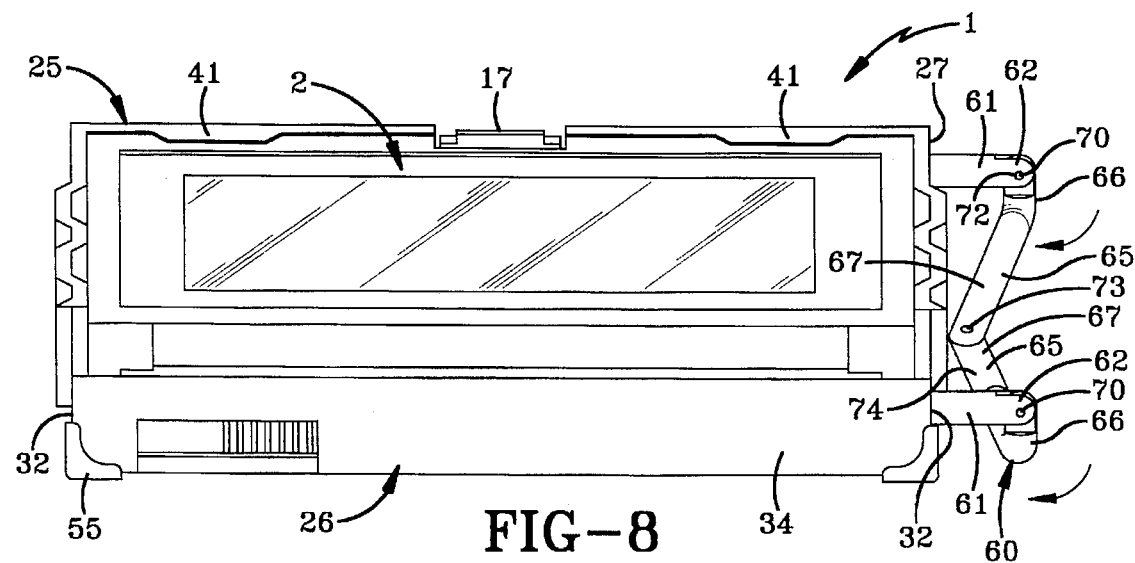

PROTECTIVE CASE FOR PORTABLE COMPUTER

BACKGROUND OF THE INVENTION

1. Technical Field

The invention relates generally to portable computers. More specifically, the invention relates to a protective case for a portable computer. Specifically, the invention relates to a protective case for a portable computer having a display movable relative to a keyboard, and whereby the display may be latched in an open position and a closed position relative to the keyboard.

2. Background Information

Since the advent of the personal computer, manufacturers and industrial users have continually developed faster, smaller and more versatile machines, including portable computers that are dedicated to perform a specific function such as word processing, data collection or item identification. Alternatively, portable computers may be all purpose computing machines capable of running a variety of types of software programs. These portable personal computers may interact with a variety of portable and stationary peripheral input/output devices such as printers, light pens, image scanners, video scanners, etc. Moreover, these computers may have an electric power cord for receiving power from a standard electric outlet, as well as a battery pack for powering the unit when an electric outlet is unavailable or is inconvenient. The portability and versatility of portable computers, in combination with the ever decreasing size and weight of these machines, has attracted a significant number of users, with the number of users expected to dramatically increase in the near term.

Portable computers have progressed significantly, and the industry has recently enjoyed the introduction of palm top and lap top computers. One such computer is the HP 200LX Palm Top PC manufactured by Hewlett Packard of Portland, Oregon. Both palm top and lap top computers generally include an upper housing for a display, a lower housing for a keyboard, and a pivot for pivotally attaching the upper housing to the lower housing. Such construction is often referred to as clam shell construction. Generally, the upper housing and display are rotated away from the keyboard when the user wishes to utilize the portable computer, and are similarly rotated toward the keyboard when the palm top or portable computer is not in use. The cost of these versatile portable computers continues to decrease as they are becoming increasingly familiar in all areas of business and personal life, and the manufacturers enjoy savings due to the economies of scale associated with mass production.

Alternatively, dedicated computers are designed to fill a specific need. One such device is manufactured by Symbol Technologies, Inc. of Bohemia, New York and is the subject matter of U.S. Pat. No. 5,107,100. While devices of this type offer added convenience to the end user, and are manufactured of heavier materials, these devices are generally user specific and thus do not enjoy the economies of scale associated with mass production. These devices are somewhat more costly than the mass produced portable and palm top computer counterparts. Nonetheless, many individuals and corporations continue to use dedicated computers as the same are generally manufactured to withstand a rugged environment, and are also generally manufactured to be ergonomically productive in specific situations. Specifically, one such situation occurs when a user, such as a salesman, etc., wishes to utilize his portable computer to determine existing stock needs while moving around a retail or wholesale establishment. Existing palm top computers are generally not manufactured for such rugged use such that if the salesman would inadvertently drop the unit, the same may be irreparably damaged. Additionally, the palm top computer display does not remain in a fixed open position relative to the keyboard such that the user can hold the same in the open position with relative ease, much as a user would hold a clipboard to perform a similar task. As such, users continue to use dedicated computers, paying the increased costs associated therewith.

Dedicated computers also do not solve all of the problems in certain circumstances. Specifically, while the dedicated machine may well provide ease of operation when in use, the same is not well protected and transportable when the machine is not in use as generally the display remains fixed relative to the keyboard and is not rotatable with respect thereto.

Thus, while a number of prior art general purpose and dedicated computing devices have been developed, and are presumably adequate for the purpose for which they are intended. These prior devices fail to provide a mass produced portable computer which may be safely utilized while the user is in motion, and in which the display will rotate relative to the housing such that it will move between an open position and a closed position. Additionally, prior devices do not provide for a display to be latched in position relative to the keyboard when the display is in both the closed position and the open position.

Therefore, the need exists for a protective case for a portable computer which substantially increases the computer's resistance to breakage as a result of rugged use, and which permits the display to be locked in position relative to the keyboard when the display is in both the open position and the closed position.

SUMMARY OF THE INVENTION

Objectives of the invention include providing a protective case for a portable computer which substantially increases the computer's resistance to damage as a result of rugged use.

A further objective is to provide a protective case for a portable computer which substantially increases the computer's resistance to rugged use while simultaneously assuring that the computer remains relatively lightweight and compact in size.

Yet another objective is to provide a protective case for a portable computer which includes a keyboard case for housing the keyboard, and a display case for housing the display whereby the display case is pivotally mounted on the keyboard case.

A further objective of the invention is to provide a protective case for a portable computer whereby the pivot on the case is axially aligned with the pivot on the portable computer.

Another objective of the invention is to provide a protective case for a portable computer whereby the protective case may be retrofitted to existing computers.

A still further objective is to provide a protective case for a portable computer whereby the display may be locked against movement relative to the keyboard when the display is in both the open position and the closed position.

Another objective of the invention is to provide a protective case for a portable computer in which the protective case is provided with a handle extending between the lower housing and the upper housing, and in which the handle locks the display against movement relative to the keyboard when a portable computer is in the open position.

Yet another objective of the invention is to provide a protective case for a portable computer in which the handle may be utilized to carry the portable computer either when the display is in the open position or in the closed position.

A still further objective of the invention is to provide such a protective case for a portable computer which is of a simple construction, which achieves the stated objectives in a simple, effective and inexpensive manner and which solves problems and satisfies needs existing in the art.

These and other objectives and advantages of the improved invention are obtained by the protective case for a portable computer, the general nature of which may be stated as including a keyboard case adapted to receive a keyboard; a display case adapted to receive a display whereby the display case being movable between an open position and a closed position relative to the keyboard; a handle attached to at least one of the display case and a keyboard case whereby the handle is movable between an unlatched position whereby the display case is movable relative to the keyboard case, and a latched position whereby the display case is latched against movement relative to the keyboard case.

BRIEF DESCRIPTION OF THE DRAWINGS

The preferred embodiment of the invention, illustrative of the best mode in which applicants have contemplated applying the principles, is set forth in the following description and is shown in the drawings and is particularly and distinctly pointed out and set forth in the appended claims.

FIG. 6 is a rear view of the protective case of the present invention;

FIG. 7 is a front elevational view of the protective case shown in combination with a portable computer, and with a handle in a first position;

FIG. 8 is a front elevational view of the protective case shown in combination with a portable computer, and with a handle in a second position.

Similar numerals refer to similar parts throughout the drawings.

DESCRIPTION OF THE PREFERRED EMBODIMENT

Figure 4:
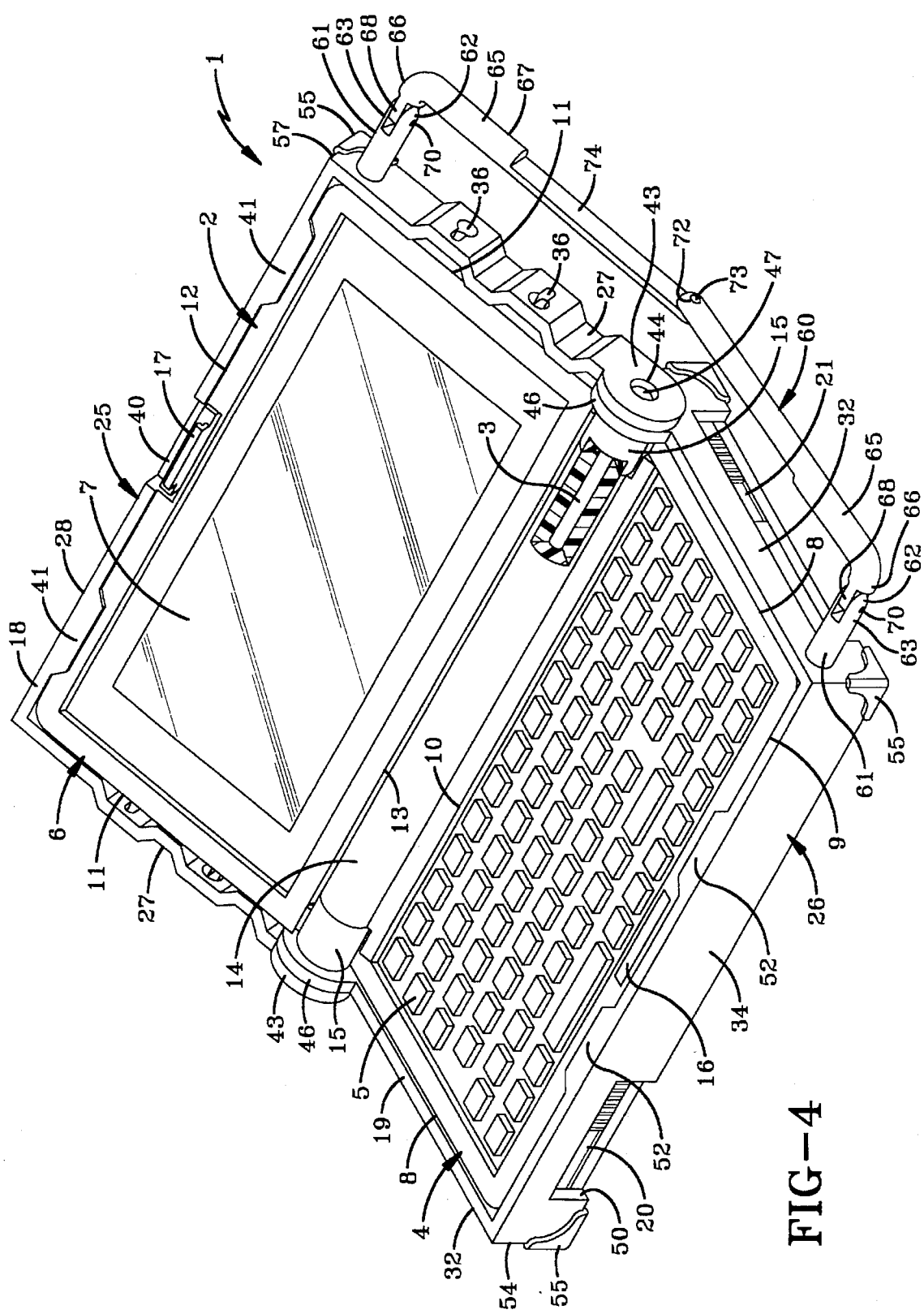
FIG. 4 is a perspective view of the protective case in combination with a portable computer with portions of the portable computer broken away.

The improved protective case of the invention is indicated generally at 1, and is adapted to hold a portable computer, illustrated in FIG. 4 and indicated generally at 2. Moreover, protective case i is adapted to be mounted on portable computer 2. Portable computer 2 is of the general clam shell type having a base housing 4 with a standard keyboard 5 mounted thereon. A top housing 6 houses a display screen 7, and is pivotally attached to base housing 4 via a hinge pin 3 and may be moved between a closed position whereby the display screen covers keyboard 5 and an open position (FIG. 4). Base housing 4 is formed with a pair of parallel and spaced apart sidewalls 8, a front wall 9 and a rear wall 10 spaced apart from front wall 9. Similarly, top housing 6 is formed with a pair of parallel and spaced apart sidewalls 11, a front wall 12, and a rear wall 13 spaced apart from front wall 12. Rear wall 10 is provided with a centrally located upwardly extending flange 14 and rear wall 13 is provided with a pair of spaced apart downwardly extending flanges 15. One downwardly extending flange 15 extends on either side of upwardly extending flange 14 with both flanges 5 14 and 15 being formed with axially aligned holes for receiving a hinge pin 3 for permitting movement of top housing 6 relative to base housing 4.

Front wall 9 is formed with a centrally located recess 16, and front wall 13 of top housing 6 is formed with a projection to be received within recess 16. Recess 16 and projection 17 operatively engage to latch portable computer 2 in the closed position as shown specifically in FIGS. 2 and 6. Additionally, portable computer 2 is normally provided with a plurality of input/output ports such as port 20 extending through front wall 9, and port 21 extending through sidewall 8.

Figure 1:
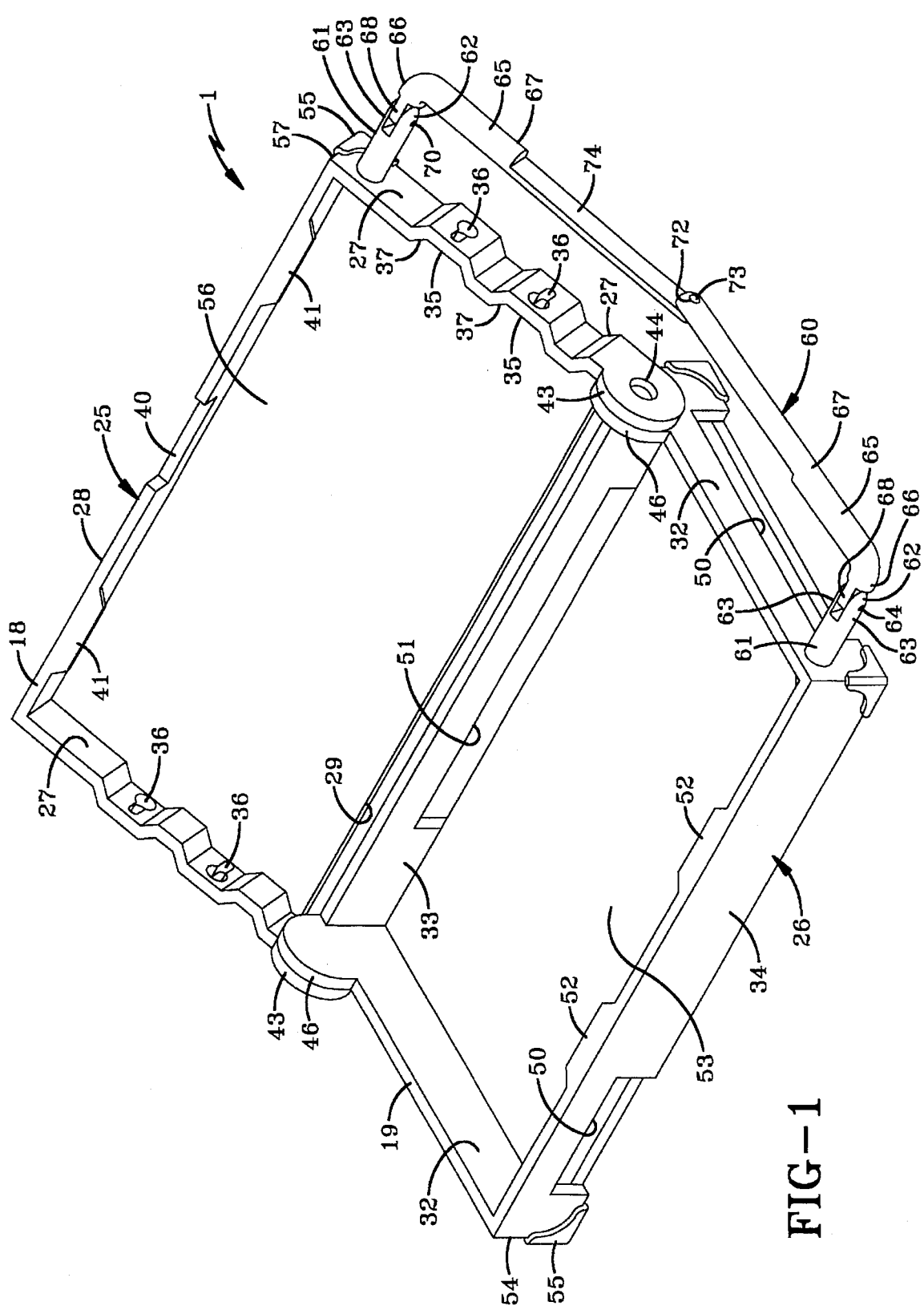
FIG. 1 is a perspective view of the protective case in an open position.

Referring to FIG. 1, and in accordance with the main feature of the present invention, protective case 1 is provided with a display case 25 and a keyboard case 26. Display case 25 is formed with a plurality of parallel and spaced apart sidewalls 27, a front wall 28 and a rear opening 29. Similarly, keyboard case 26 is formed with a pair of parallel and spaced apart sidewalls 32, a rear wall 33 and a front wall 34 parallel to rear wall 33.

Figure 9:
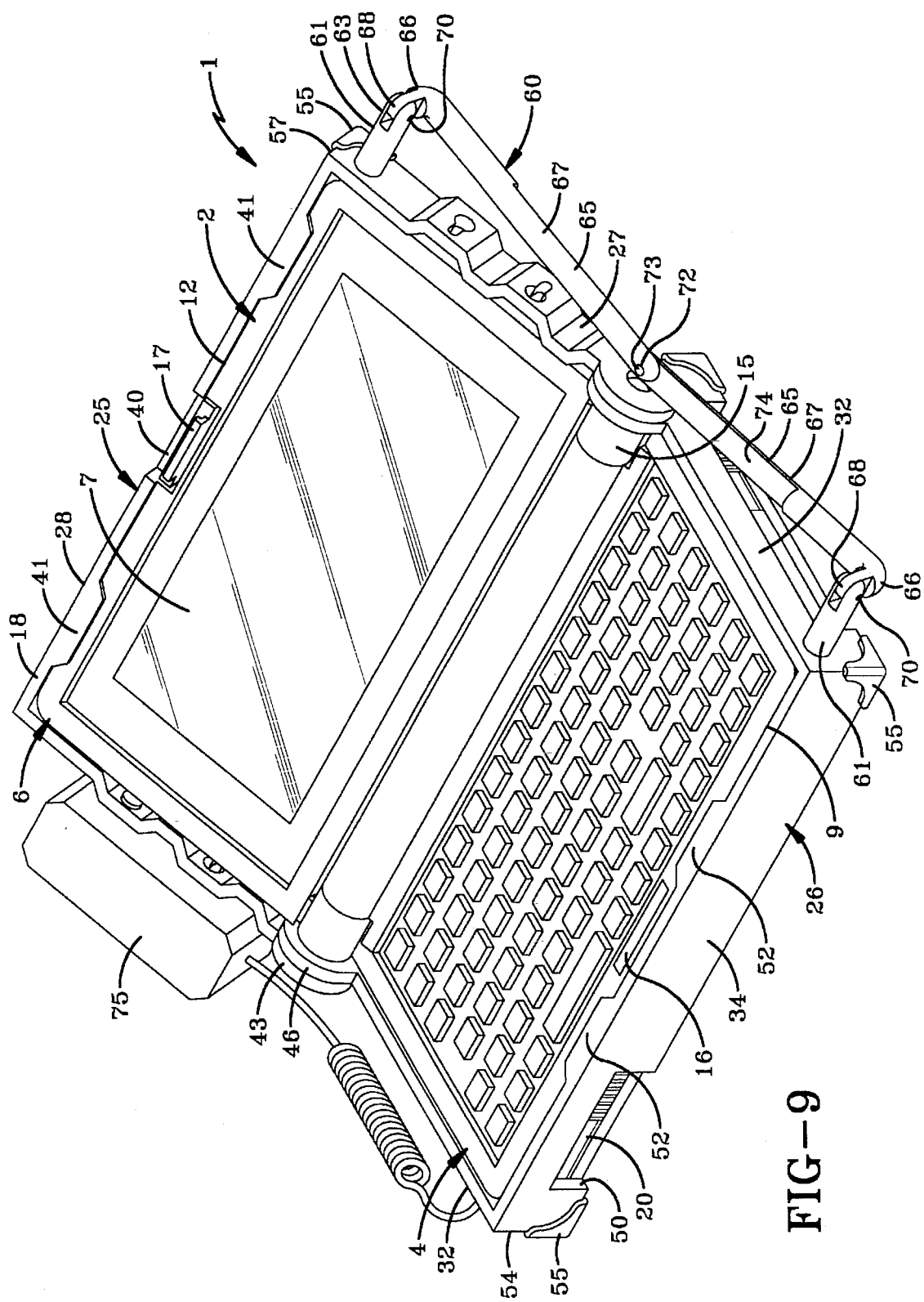
FIG. 9 is a perspective view similar to FIG. 5, and shown with a bar-code scanner attached thereto.

Sidewalls 27, and front wall 28 form a first perimeter surface 18 while sidewalls 32 and front wall 34 form a second perimeter surface 19. Sidewalls 27 of display case 25 are each formed with a plurality of outwardly extending mounting bosses 35. Each mounting boss 35 is formed with a keyhole shaped opening 36 for receiving a mounting pin of a computer peripheral (FIG. 9) as described more fully hereinbelow. Each mounting boss 35 angles outwardly away from associated sidewall 27 and is formed with a recessed slot 37 for receiving the head of the peripheral mounting pin (FIG. 9). Front wall 28 of display case 25 is further formed with a centrally located recess 40 which is aligned with projections 17 of portable computer 2. A user may thus extend a finger through recess 40 to contact projections 17 and disengage projections 17 from recess 16 thereby unlatching portable computer 2. Front wall 28 is also formed with a pair of inwardly extending flanges 41.

Figure 3:
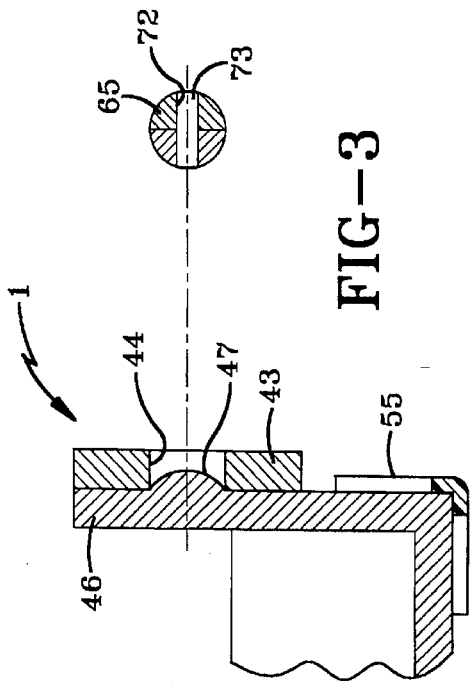
FIG. 3 is a sectional view taken along line 3—3, FIG. 2.

Each sidewall 27 of display case 25 is formed with a round pivot flange 43 adjacent rear opening 29. Each pivot flange 43 is formed with a central pivot hole 44 (FIG. 3).

Similarly, sidewalls 32 of keyboard case 26 are formed with pivot flanges 46 adjacent rear wall 33. Pivot flanges 46 are formed with outwardly extending mounting balls 47 (FIG. 3) which extend into pivot holes 44. Each mounting ball 47 thus extends into a pivot hole 44 such that display case 25 may be rotated relative to keyboard case 26 via the movement of flanges 43 relative to flanges 46. In further accordance with one of the elements of the present invention, mounting ball 47 and cooperating pivot holes 44 are axially aligned with hinge pin 3 extending through upwardly extending flanges 15 and downwardly extending flange 14 of portable computer 2 such that top housing 6 rotates about base housing 4 about the same axis of rotation as display case 25 rotates about keyboard case 26.

One sidewall 32 and front wall 34 of keyboard case 26 are formed with access openings 50 which align with ports 20 and 21 of portable computer 2. Similarly, rear wall 33 is formed with an access opening 51 which aligns with a variety of access ports, and control mechanisms along rear wall 10 of portable computer 2. Front wall 34 is also formed with a pair of spaced apart inwardly extending flanges 52 such that flanges 52 are positioned intermediate flanges 41 of display case 25 when protective case 1 is in the closed position shown in FIG. 2. As such, inasmuch as flanges 41 and 52 are offset relative to each other, any irregularities within flanges 41 or 52 as a result of the forming process, will not operate to hold perimeter surfaces 18 and 19 apart when protective case 1 is in the closed position with surfaces 18 and 19 remaining in full surface contact.

Keyboard case 26 is formed with a bottom wall 53, which joins sidewalls 32, rear wall 33 and front wall 34 which is substantially perpendicular thereto. Bottom wall 53 joins each sidewalls 32, rear wall 33 and front wall 34 opposite perimeter surface 18 with each sidewall 32 joining rear wall 33 and front wall 34 at a respective corner 54. Each corner 54 receives a rubber bumper 55 to increase the protective case's resistance to breakage as a result of rugged use. Similarly, display case 25 is formed with a top wall 56 which is substantially perpendicular to sidewalls 27 and front wall 28. Each sidewall 27 joins front wall 28 at a corner 57, with each corner 57 also receiving a rubber bumper 55. Note that display case 25 is not formed with a rear wall, but rather includes rear opening 29 for receiving portable computer 2. As such, a rubber bumper is not provided where each sidewall 27 joins rear opening 29.

In accordance with one of the primary features of the present invention, an articulating handle 60 extends between display case 25 and keyboard case 26. A mounting stud 61 is mounted to a sidewall 27 of display case 25 and to a sidewall 32 of keyboard case 26 adjacent front walls 28 and 34 respectively. While mounting studs 61 may be mounted to sidewalls 27 and 32 in any convenient manner, in the preferred embodiment they are threaded into complementary shaped apertures formed in sidewalls 27 and 32. Each stud 61 is formed with a free end 62 having a pair of upwardly extending parallel and spaced apart mounting flanges 63. Mounting flanges 63 are formed with axially aligned holes 64. Articulating handle 60 is formed with a pair of L-shaped halves 65 whereby each half is formed with a short leg 66 and a long leg 67. Short leg 66 of each L-shaped half 65 is formed with a necked down portion 68 and an aperture axially aligned with holes 64. Necked down portion 68 is sized to be received intermediate mounting flanges 63, with holes 64 and the aperture formed in necked down portion 68 being sized to receive a pivot pin 70. When protective case 1 is in the open 5 position shown particularly in FIG. 1, pivot pins 70 are axially aligned such that handle 60 may be rotated about pivot pins 70 relative to mounting studs 61.

Long legs 67 are also formed with axially aligned holes 72 for receiving a pivot pin 73. Pivot pin 73 is substantially parallel to pivot pins 70 when in the position shown in FIG. 1. Long legs 67 of L-shaped halves 65 are formed with recessed flats 74 which assure that L-shaped half 65 may rotate relative to each other about pivot pin 73 (FIG. 2).

Figure 2:
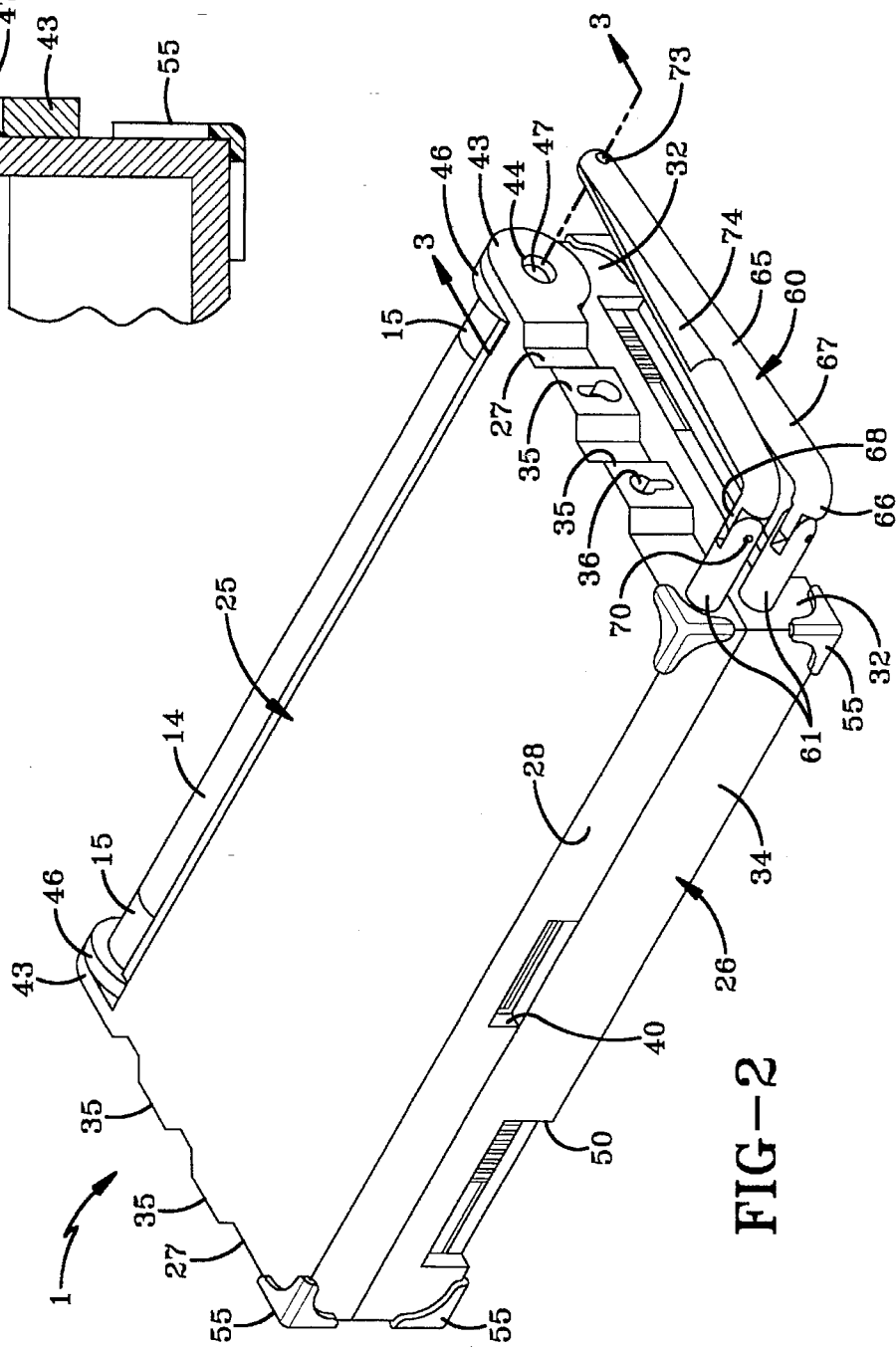
FIG. 2 is a perspective view of the protective case in a closed position.

Referring particularly to FIGS. 1 and 2, inasmuch as mounting balls 47 and pivot holes 44 are axially aligned with hinge pin 3 of portable computer 2, protective case 1 may be moved between the open position shown in FIGS. 1 and 4, and the closed position shown in FIGS. 2 and 6 when portable computer 2 is mounted therein. Referring to FIG. 4, top housing 6 of portable computer 2 is mounted within display case 25 and extends below flanges 41. Similarly, base housing 4 of portable computer 2 is received within keyboard case 26 and below flanges 52 with hinge pin 3 of portable computer 2 extending coaxial with pivot mounting balls 47. Sidewalls 27, front wall 28 and top wall 56 extend around top housing 6 whereby display 7 is protected against damage as a result of rugged use. Similarly, sidewalls 32, rear wall 33, front wall 34 and bottom wall 53 extend around base housing 4 such that keyboard 5 is protected against damage as a result of rugged Use.

When the user is transporting protective case 1 with enclosed portable computer 2, the unit is moved to the position shown in FIGS. 2 and 6, such that display 7 is rotated downwardly over keyboard 5 to the closed position whereby substantially all sides of portable computer 2 are covered by protective case 1 with bumpers 55 extending over corners 54 and 57.

When the user wishes to open protective case 1 and portable computer 2 for use, the user merely places a finger through recess 40 to disengage projections 17 and recess 16. Thereafter, display case 25 may be rotated about mounting balls 47 relative to keyboard case 26. As display case 25 is rotated from the closed position to the open position relative to keyboard case 26, handle 60 articulates about pivot pin 73. Handle 60 may thus be utilized to carry protective case 1 when portable computer 2 is in the closed position as shown particularly in FIG. 2, and may also be utilized to carry portable computer 2 when protective case 1 is in the open position.

Handle 60 may also be utilized to latch display case 25 against movement relative to keyboard case 26 such that as the user moves about a warehouse or plant, display case 25 will remain in the opened position. Specifically, handle 60 may be moved from the position shown in FIGS. 4 and 7 to the position shown in FIGS. 5 and 8 whereby L-shaped legs 65 are rotated about axially aligned pivot pins 70. When handle 60 is in the position shown in FIGS. 4 and 7, the longitudinal axis of pivot pin 73 is parallel with the axis of rotation of both protective case 1 and portable computer 2 whereby rotation of display case 25 relative to keyboard case 26 will effectuate rotation of L-shaped halves 65 of handle 60.

Figure 5:
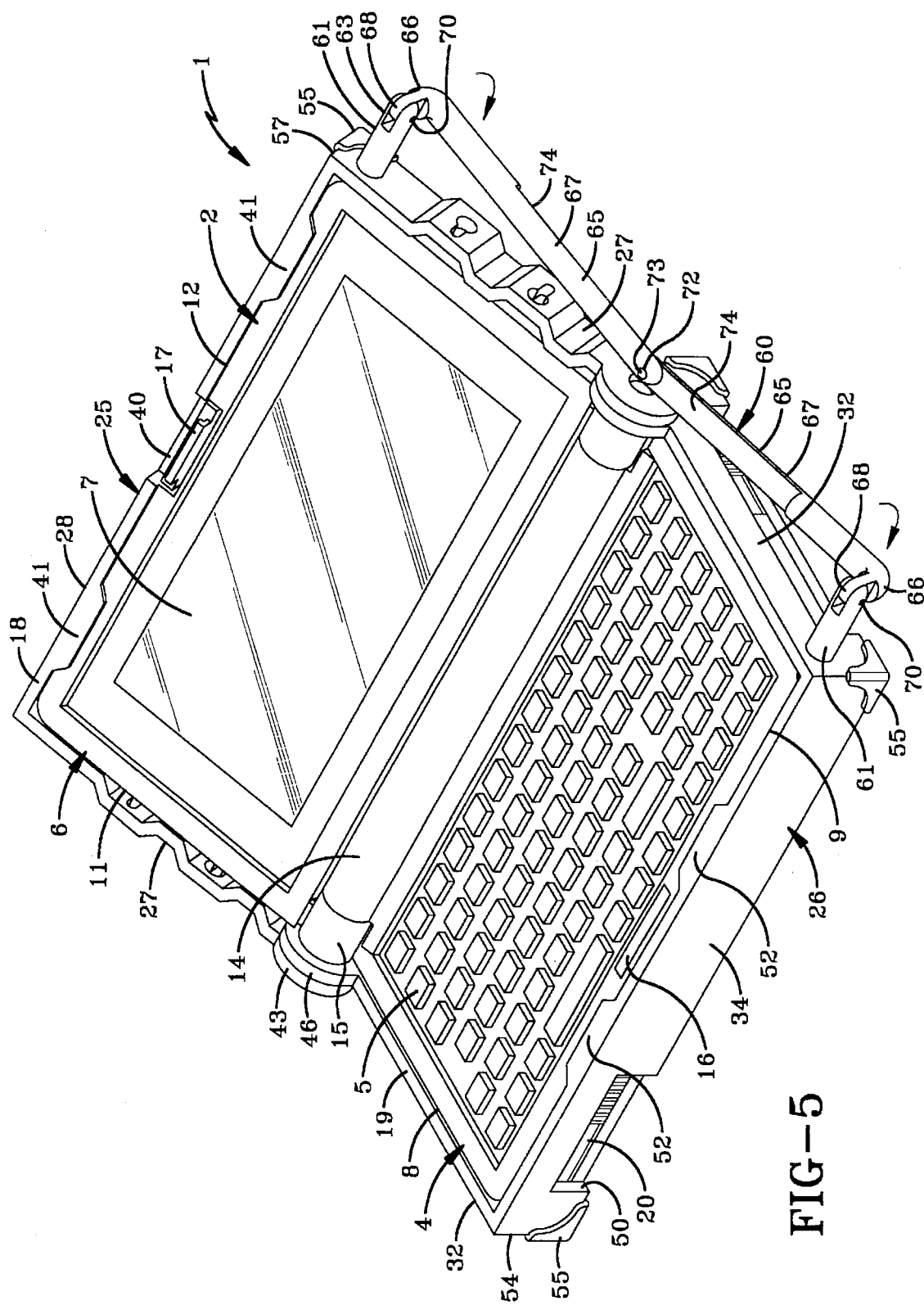
FIG. 5 is a perspective view shown in FIG. 4 with the handle rotated downwardly.

Conversely, when handle 60 is rotated to the position shown in FIGS. 5 and 8, pivot pin 73 is substantially perpendicular to the axis of rotation of protective case 1, and portable computer 2. Specifically, pivot pin 73 is perpendicular to hinge pin 3, and the axis of rotation of mounting balls 47 and pivot holes 44. As a result, L-shaped legs 65 of handle 60 cannot rotate relative to each other about pivot pin 73 in response to movement of display case 25 relative to keyboard case 26. Protective case 1 is thus essentially latched in the open position such that the same may be used as a user moves about a warehouse or an office space.

Once protective case 1 is moved to the open position, and handle 60 has been rotated downwardly to the position shown in FIGS. 5 and 8, one or more peripheral devices may be mounted within keyhole shaped openings 36 of mounting bosses 35 as shown particularly in FIG. 9. FIG. 9 shows protective case 1 housing a portable computer 2 in the open position, with handle 60 moved to the latched position. The user may then mount an external device 75 such as the bar-code scanner shown in FIG. 9, within keyhole shaped openings 36 formed in mounting bosses 35. In this manner, the device is also held stationary relative to keyboard case 26 and is easily accessible as the user moves around a warehouse or plant.

In the preferred embodiment, protective case 1 is manufactured of aluminum, with bumpers 55 being manufactured of resilient rubber. However, protective case 1 may be manufactured of a variety of materials, including polyesters and polyethylene, without departing from the spirit of the present invention.

As should also be apparent from a review of the preferred embodiment, protective case 1 may directly house electronic components such that the same is an integral part of the portable computer. In this manner, base housing 4 and top housing 6 are merely eliminated with handle 60 being attached to display case 25 and keyboard case 26.

Accordingly, the improved protective case is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved protective case is constructed and used, the characteristics of the construction, and the advantageous, new and useful results obtained; the new and useful structures, devices, elements, arrangements, parts and combinations, are set forth in the appended claims.

We claim:

1. A protective case for a portable computer of the type having a keyboard and a display movable relative to the keyboard, said protective case comprising:

a keyboard case adapted to receive a keyboard;

a display case adapted to receive a display whereby the display case being movable between an open and a closed position relative to the keyboard;

hinge means for hingedly connecting the keyboard case to the display case, said hinge means facilitates the movement of the display case between the open and closed positions relative to the keyboard case;

a handle attached to the display case and the keyboard case whereby the handle is movable between an unlatched position whereby the display case is movable relative to the keyboard case, and a latched position whereby the display case is latched against movement relative to the keyboard case; and pivot means mounted on the handle for pivoting said handle between the unlatched and latched position, said pivot means latches said display case against movement relative to the keyboard case.

2. A protective case as defined in claim 1 in which the handle is formed with a pair of ends; in which a pair of mounting studs extend outwardly from the protective case; and in which each handle end is movably mounted to a mounting stud.

3. A protective case as defined in claim 2 in which a pivot pin extends through each mounting stud; and in which each handle end is rotatably mounted on the pivot pins for rotatably moving between the latched and unlatched positions.

4. A protective case as defined in claim 3 in which the pivot pins are axially aligned when the protective case is in the open position.

5. A protective case as defined in claim 3 in which one mounting stud is attached to the display case, and the other mounting stud is attached to the keyboard case.

6. A protective case as defined in claim 5 in which the handle is formed with articulating means for permitting the handle to articulate between a closed position and an open position.

7. A protective case as defined in claim 6 in which the articulating means includes a pivot pin; in which the handle includes a pair of handle halves, and in which the pivot pin extends through each of the handle halves whereby the handle halves may rotate about the pivot pin relative to each other.

8. A protective case as defined in claim 1 in which the protective case is formed with a plurality of corners; and in which each of the plurality of said corners receive a rubber bumper thereover.

9. A protective case as defined in claim 1 in which at least one of the display case and keyboard case is formed with a mounting means for mounting a computer peripheral to a protective case.

10. A protective case as defined in claim 9 in which the mounting means is a plurality of holes formed in one of the display case and keyboard case for receiving mounting pins.

11. A protective case as defined in claim 1 in which one of the display case and keyboard case includes a mounting ball, and the other of the display case and keyboard case is formed with a recess for receiving said mounting ball; and in which the display case is rotatably mounted on said mounting ball.

12. A protective case as defined in claim 11 in which the mounting ball rotates around and defines an axis of rotation, said axis of rotation being adapted to axially align with an axis of rotation of a hinge pin of the portable computer when the keyboard and display of said portable computer are received within their respective cases.

13. In combination, a portable computer of the type having a keyboard and a display movable between an open position and a closed position relative to the keyboard, and a protective case for said portable computer, said protective case comprising:

a keyboard case for receiving the keyboard;

a display case for receiving the display whereby the display case being movable between an open position and a closed position relative to the keyboard case;

hinge means for hingedly connecting the keyboard case to the display case, said hinge means facilitates the movement of the display case between the open and closed positions relative to the keyboard case;

a handle attached to the display case and the keyboard case whereby the handle is movable between an unlatched position whereby the display case is movable relative to the keyboard case, and a latched position whereby the display case is latched against movement relative to the keyboard case; and pivot means mounted on the handle for pivoting said handle between the unlatched and latched position, said pivot means latches said display case against movement relative to the keyboard case.

14. The combination as defined in claim 13 in which the handle is formed with a pair of ends; in which a pair of mounting studs extend outwardly from the protective case; and in which each handle end is movably mounted to a mounting stud.

15. The combination as defined in claim 14 in which a pivot pin extends through each mounting stud; and in which each handle end is rotatably mounted on the pivot pins for rotatably moving between the latched and unlatched positions.

16. The combination as defined in claim 15 in which the handle is formed with articulating means for permitting the handle to articulate between a closed position and an open position.

17. The combination as defined in claim 16 in which one of the pivot case and keyboard case includes a mounting ball, and the other of the display case and keyboard case is formed with a recess for receiving said mounting ball; and in which the display case is rotatably mounted on said mounting ball.

18. The combination as defined in claim 17 in which the mounting ball is adapted to be axially aligned with a hinge pin of the portable computer.

19. A protective case for a portable computer of the type having a keyboard and a display movable relative to the keyboard, said protective case comprising:

a keyboard case adapted to receive a keyboard;

a display case adapted to receive a display whereby the display case being movable between an open and a closed position relative to the keyboard;

a pair of mounting studs which extend outwardly from the protective case, one of said mounting studs being attached to the display case and the other of said mounting studs being attached to the keyboard case;

a pair of first pivot pins extending through the mounting studs;

a handle attached to the display case and the keyboard case whereby the handle is movable between an unlatched position whereby the display case is movable relative to the keyboard case, and a latched position whereby the display case is latched against movement relative to the keyboard case, said handle being formed of a pair of handle halves each having an end which is movably mounted to one of said mounting studs and rotatably mounted on one of said first pivot pins; and articulating means formed on the handle for permitting the handle to articulate between a closed position and an open position, said articulating means including a second pivot pin which extends through each of the handle halves whereby the handle halves may rotate about said second pivot pin relative to each other.

20. A protective case as defined in claim 19 in which the pivot pin is adapted to extend substantially parallel to a pivot pin of the portable computer when the protective case is in the unlatched position; and in which the pivot pin is adapted to extend substantially perpendicular to the axis of rotation of a pivot pin of the portable computer when in the latched position for preventing movement of the display case relative to the keyboard case.

* * * * *